(12) United States Patent
Soto et al.

(10) Patent No.: US 6,825,577 B2
(45) Date of Patent: Nov. 30, 2004

(54) DUAL POWER POLARITY PROTECTOR/INDICATOR

(75) Inventors: Roy L. Soto, Moorpark, CA (US); Alan B. Lowell, Camarillo, CA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 10/013,341

(22) Filed: Dec. 10, 2001

(65) Prior Publication Data

US 2003/0107270 A1 Jun. 12, 2003

(51) Int. Cl.$^7$ ................................................. H02B 1/24
(52) U.S. Cl. ........................... 307/64; 307/66; 307/127
(58) Field of Search .............................. 307/64, 65, 66, 307/127

(56) References Cited

U.S. PATENT DOCUMENTS

| | | | | |
|---|---|---|---|---|
| 4,027,223 A | * | 5/1977 | Renz | 307/127 |
| 4,139,880 A | * | 2/1979 | Ulmer et al. | 307/127 |
| 4,319,144 A | * | 3/1982 | King et al. | 307/127 |
| 4,423,456 A | * | 12/1983 | Zaidenweber | 307/127 |
| 4,473,757 A | * | 9/1984 | Farago et al. | 307/127 |
| 4,513,176 A | | 4/1985 | Fostveit | 179/175.1 R |
| 4,513,179 A | | 4/1985 | Phillips et al. | 179/175.3 R |
| 4,528,459 A | * | 7/1985 | Wiegel | 307/66 |
| 4,600,810 A | | 7/1986 | Feldman et al. | 179/175.3 R |
| 4,901,003 A | | 2/1990 | Clegg | 324/66 |
| 5,251,179 A | * | 10/1993 | Wittman | 307/66 |
| 5,623,550 A | * | 4/1997 | Killion | 307/127 |
| 5,894,413 A | * | 4/1999 | Ferguson | 307/66 |
| 6,519,126 B2 | * | 2/2003 | Tamura | 307/127 |

* cited by examiner

Primary Examiner—Jeffrey Sterrett
(74) Attorney, Agent, or Firm—Allen, Dyer, Doppelt, Milbrath & Gilchrist, P.A.

(57) ABSTRACT

A diode-configured power supply interface circuit prevents inadvertent miswiring of power supply leads to wrong polarity voltages of either primary or auxiliary DC supply voltages from triggering the operation of a circuit protection device installed in the power supply path of a telecommunication circuit. It also indicates whether the device's power terminals are properly connected to a power source, so that if inadvertently reversed, the wires can be properly reconnected, and thereby provide for delivery of power from either power source, as required.

9 Claims, 1 Drawing Sheet

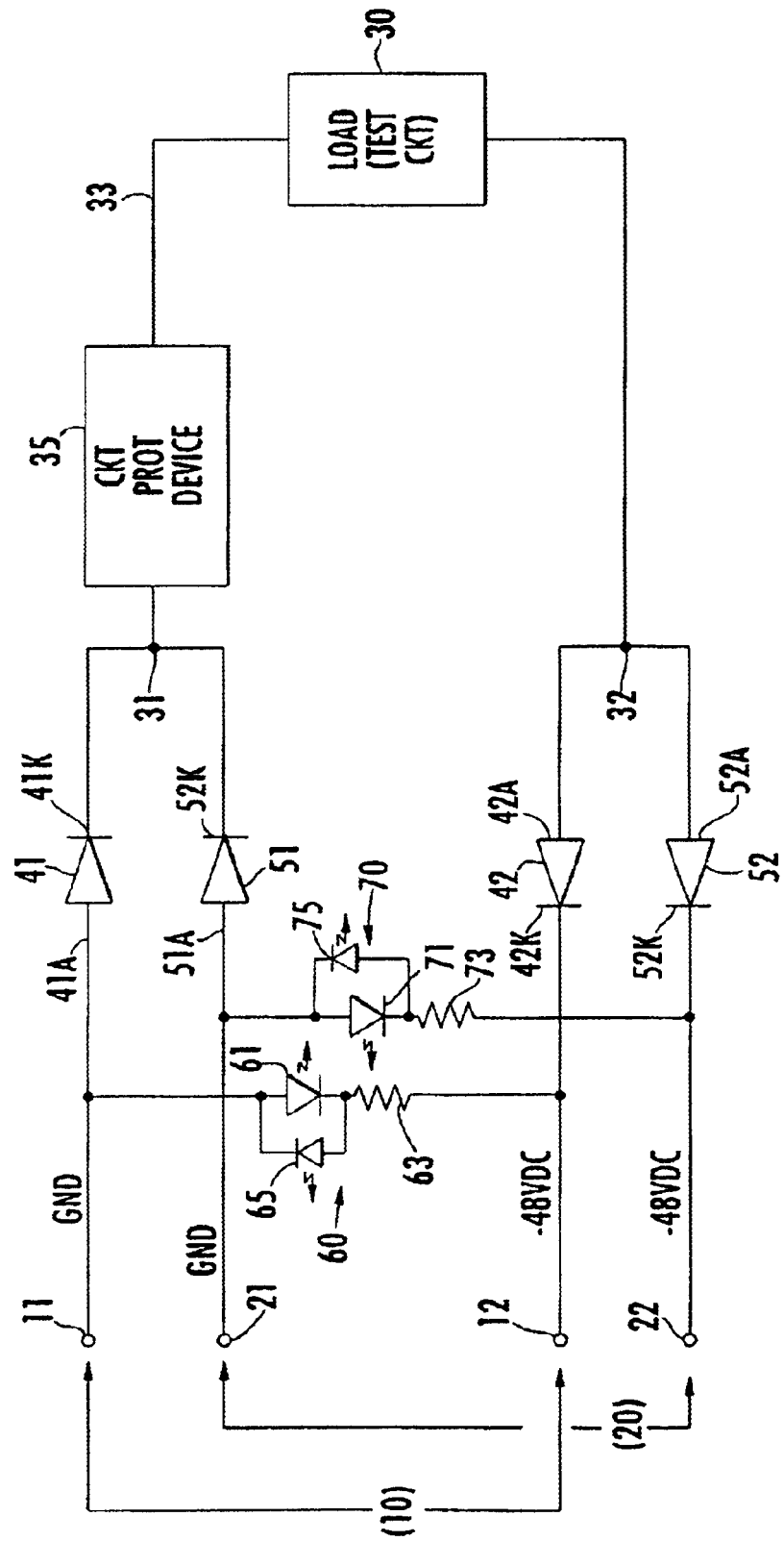

DUAL POWER POLARITY PROTECTOR/ INDICATOR

FIELD OF THE INVENTION

The present invention relates in general to communication systems and components therefor, and is particularly directed a power supply interface circuit that is configured to prevent a circuit path of telecommunication equipment, such as a telephone line test device, containing an circuit interruption device (such as a fuse or circuit breaker), from being subjected to an improper (reverse) connection to a power source therefor (such as a primary power source and an auxiliary battery), so that the circuit interruption device will not be tripped thereby. In addition, the inventive interface circuit includes an indicator circuit that is operative to indicate whether the device's power terminals are properly connected to each power source, so that, if inadvertently reverse-connected, the wires can be properly reconnected, and thereby provide for delivery of power to the device from either power source, as required.

BACKGROUND OF THE INVENTION

Users of telecommunication system equipment often install one or more auxiliary devices, such as but not limited to test units and the like, at either or both of host (central office (CO)) and remote (customer premises) sites of the system. In addition to being interfaced with communication links of the system proper, these devices must be properly powered. In some instances, the power may be drawn from the same wires used to send voice and/or data over the telephone lines. This type of powering, which is sourced from a CO battery (–48 VDC and ground (GND)), is commonly referred to as 'loop' or 'span' powering, and permits the phone company to remotely power equipment that may be located up to several miles from the central office.

Within the telephone networks of the continental United States, loop powering is used extensively on mid-span devices (rather than termination devices) in DDS, ISDN, T1, HDSL, and other digital networks. Terminating devices for digital data services are generally not span-powered; instead, being typically located within the customer's premises, they receive power from the customer's local utility feed. In addition, the auxiliary device may not continuously require span-supplied power, or it may use this power only during emergency situations.

Where the auxiliary device is powered from a local utility, as in the case of equipment installed at the customer's premises, a loss of local power (for example during a lighting storm) will cause the terminating device to stop functioning. This is problematic for digital services (such as ISDN) that implement plain-old-telephone-service (POTS) support. Thus, a local power failure will cause a loss of phone service (including emergency service, such as the ability to place a 911 call). As a consequence, digital service customers have traditionally been required to maintain a separate standard analog phone line, in addition to the digital data line(s).

Irrespective of the need to provide auxiliary POTS service, the type of equipment employed, or whether the equipment is located within the central office or at a remote site, it has become common practice to employ multiple (dual) power feeds, one serving as a primary supply, and the other providing an auxiliary back-up. These two feeds typically include a CO battery, as well as an auxiliary DC supply, that are "OR"-fed to the auxiliary circuit of interest through a circuit interruption or protection device, such as a fuse or circuit breaker. Unfortunately, during installation of the equipment, it sometime happens that one or both pairs of power supply leads are miss-wired (reversed)—resulting in triggering the operation of the protection device (i.e., tripping the circuit breaker or blowing the fuse).

SUMMARY OF THE INVENTION

In accordance with the present invention, this problem is effectively obviated by a new and improved power supply interface circuit, that is configured to prevent the power supply path to the telecommunication circuitry, which contains a circuit interruption or protection device, from being subjected to an improper (reverse) connection of the device's power terminals to one or more power sources. In addition, the invention contains a polarity indicator circuit that is operative to indicate whether the device's power terminals are properly connected to a power source, so that if inadvertently reversed, the wires can be properly reconnected, and thereby provide for delivery of power from either power source, as required.

For this purpose, respective sets of power supply connection terminals are provided to allow connection to respectively different sources (e.g. a primary (CO) supply and a back-up supply) capable of providing operational power for the telecommunication circuit. Each set of terminals includes one terminal to be coupled to the relatively positive power supply voltage (e.g., ground) and a second terminal to be coupled to the relatively negative power supply voltage (–48 VDC).

Each set of power supply terminals is connected to respective nodes of the power supply circuit path through diodes, which are forward conducting for only a proper polarity connection of the power supply connection terminal to a respective power source, but prevent the protection device from being triggered in the event of an improper (reverse) connection of either set of power terminals to its associated power sources.

In addition, to indicate whether the power supply terminals are connected to the proper polarity supply voltage, a polarity indicator circuit, containing one or more light emitting diodes, is coupled across each set of power supply connection terminals.

BRIEF DESCRIPTION OF THE DRAWINGS

The single FIGURE is a schematically illustration of the multi-power supply interface circuit of the present invention.

DETAILED DESCRIPTION

Referring now to the single FIGURE, the multi-power supply interface circuit of the present invention is schematically shown as comprising multiple sets (pairs) of power supply connection terminals 10 and 20, each of which is associated with a respective source of DC power that supplies operational power for a telecommunication circuit (or load) 30, such as but not limited to a piece of telephone line test circuit. A circuit path 33 through which power is supplied to the telecommunication circuit 30 includes a circuit interruption or protection device, such as a fuse or circuit breaker 35.

For purposes of providing a non-limiting embodiment, each DC power source provides a differential voltage pair customarily used in present day telecommunication networks, including a relatively positive voltage (ground (GND) and a relatively negative voltage (−48 VDC). Also, while the Figure shows only two sets of power supply connection terminals, it is to be observed that the invention may be used with a different number of power supply connection terminals without departing from the invention.

The first set of power supply terminals 10 includes a first terminal 11 that is intended to be coupled to the relatively positive power supply voltage (GND) and a second terminal 12 that is intended to be coupled to the relatively negative power supply voltage (−48 VDC). Likewise, the second set of power supply terminals 20 includes a first terminal 21 intended to be coupled to the relatively positive power supply voltage (GND) and a second terminal 22 intended to be coupled to the relatively negative power supply voltage (−48 VDC).

Pursuant to the invention, connections for each set of power supply terminals to nodes 31 and 32 of the power supply circuit path 33 include respective sets of unidirectional current flow devices (diodes) 41, 42 and 51, 52, coupled in a manner that prevents the protection device 35 from being triggered in the event of an improper (reverse) connection of either set of power terminals to its associated power sources. In particular, each diode is connected between a respective power supply connection terminal and one of the circuit path's nodes, so that the diode is forward conducting for only a proper polarity connection of the power supply connection terminal to a respective power source.

Thus, in the illustrated example, for interfacing with the first set of power supply connection terminals 10, diode 41 has its anode 41A connected to the relatively positive (GND) power source terminal 11 and its cathode 41K connected to node 31, while diode 42 has its cathode 42K connected to the relatively negative (−48 VDC) power source terminal 12 and its anode 42A connected to node 32. Similarly, for interfacing with the second set of power supply connection terminals 20, diode 51 has its anode 51A connected to the relatively positive (GND) power source terminal 21 and its cathode 51K connected to node 31, while diode 52 has its cathode 52K connected to the relatively negative (−48 VDC) power source terminal 22 and its anode 52A connected to node 32.

In order to alert the user as to whether a respective set of power supply terminals is properly (correct polarity) connected to the supply voltage inputs, a respective polarity indicator circuit is coupled across each set of power supply connection terminals. Specifically, a first polarity indicator circuit 60, shown as having a light emitting diode (such as a 'green' LED) 61 in series with a resistor 63 is coupled across power supply connection terminals 11 and 12, while a second polarity indicator circuit 70, shown as having a light emitting diode 71 in series with a resistor 73 is coupled across power supply connection terminals 21 and 22. As an adjunct measure, each polarity indicator circuit may also be provided with a reverse polarity 'red' LED, respectively shown at 65 and 75, to indicate improper power supply connectivity.

In operation, as long as a respective set of power supply connection terminals is properly connected to an associated power source, e.g., terminal 11 is coupled to a relatively positive power source polarity (e.g., GND) and terminal 12 is coupled to a relatively negative positive power source polarity (e.g., −48 VDC), each of its associated diodes (e.g., 41 and 42) will be forward conducting, allowing load 30 to be supplied with operational power through the circuit path containing the protection device 35. In addition, its associated polarity indicator (e.g., green LED 61) will be forward biased, and thereby illuminated, to provide an indication that the power supply terminals are correctly wired. A like operation takes place for terminals 21 and 22 and associated diodes 51 and 42, as well as their associated LED 71. If a reverse polarity indicator is provided, that indicator will be reverse biased an not illuminated.

However, if either set of power supply connection terminals is improperly (reverse) connected to a power source, e.g., terminal 11 is coupled to a relatively negative power source polarity (e.g., −48 VDC) and terminal 12 is coupled to a positive power source polarity (e.g., GND), each of their associated diodes (e.g., diodes 41 and 42) will be reverse-biased. This will block conduction therethrough, preventing a reverse polarity voltage from being coupled across the power supply circuit path to the load 30, so that the protection device will not trip. In addition, its associated polarity indicator (e.g., 'green' LED 61) will be reverse biased, so that it is not illuminated. Where a reverse wiring indicator (e.g. 'red' LED 65) is provided, as described above, that LED will be forward biased as a result of the reverse battery connection, to alert the user that the power supply terminals are incorrectly wired.

As will be appreciated from the foregoing description, the power supply interface circuit of the invention both prevents the inadvertent miswiring of power supply leads to wrong polarity voltages of either primary or auxiliary DC supply voltages from triggering the operation of a circuit protection device, and also indicates whether the device's power terminals are properly connected to a power source, so that if inadvertently reversed, the wires can be properly reconnected, and thereby provide for delivery of power from either power source, as required.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A circuit for coupling power from a primary DC power source or an auxiliary DC power source to a telecommunication device through a power supply path having first and second nodes therefore and containing a circuit interruption device, comprising:

first and second power supply connection terminals adapted to be coupled to said primary DC power source and said DC auxiliary power source and operatively connected to respective first and second nodes; and a power supply interface circuit coupled between said first and second power supply connection terminals and said first and second nodes of said power supply path, and being configured to prevent inadvertent miswiring of said power supply connection terminals to wrong polarity voltages of either of said primary or auxiliary DC power sources from triggering the operation of said circuit interruption device, said power supply interface circuit comprising first and second sets of diodes respectively connected between said first and second power supply connection terminals and respective first and second nodes of said power supply path, so as to be forward conducting for only a proper polarity connection of its associated power supply connection terminal to a respective power source, but preventing said circuit interruption device from being triggered in the event of an improper proper polarity connection of its associated power supply connection terminal to a respective power source, wherein a first diode of the first set of diodes has its anode connected to a relatively positive power source terminal and its cathode connected to the first node and a second diode has its cathode connected to a negative power source terminal and its anode connected to the second node, and a first diode in the second set of diodes has its anode connected to the positive power source terminal and its cathode connected to the first node, while the second diode in the second set has its cathode connected to the negative power source terminal and its anode connected to the second node.

2. The circuit according to claim 1, further including an indicator circuit coupled to said first and second power supply connection terminals and being configured to indicate whether said the first and second power supply connection terminals are properly connected to a respective one of said primary and auxiliary power sources.

3. An apparatus for controllably coupling a circuit path having first and second nodes through a telecommunication device and a circuit interruption device therefor with a primary power source or an auxiliary power source, each power source being adapted to supply first and second voltages for operating said telecommunication device, comprising:

first and second power terminals adapted to be respectively coupled to said first and second voltages supplied by one of said primary power source and said auxiliary power source;

third and fourth power terminals adapted to be respectively coupled to said first and second voltages supplied by the other of said primary power source and said auxiliary power source; and an interface circuit, coupled between said first, second, third and fourth power terminals and said circuit path, and being configured to:
  i- couple power to said circuit path from said one of said primary power source and said auxiliary power source, in response to said first and second power terminals being respectively coupled to receive said first and second voltages supplied by said one of said primary power source and said auxiliary power source, but preventing power from being coupled to said circuit path from said one of said primary power source and said auxiliary power source, in response to said first and, second power terminals being respectively coupled to receive said second and first voltages supplied by said one of said primary power source and said auxiliary power source, and
  ii- couple power to said circuit path from the other of said primary power source and said auxiliary power source, in response to said third and fourth power terminals being respectively coupled to receive said first and second voltages supplied by said either of said primary power source and said auxiliary power source, but preventing power from being coupled to said circuit path from said other of said primary power source and said auxiliary power source, in response to said third and fourth power terminals being respectively coupled to receive said second and first voltages supplied by said other of said primary power source and said auxiliary power source, said interface circuit comprising sets of diodes respectively connected between said first and second power supply connection terminals and respective first and second nodes of said power supply path, so as to be forward conducting for only a proper polarity connection of its associated power supply connection terminal to a respective power source, but preventing said circuit interruption device from being triggered in the event of an improper proper polarity connection of its associated power supply connection terminal to a respective power source, wherein a first diode of the first set of diodes has its anode connected to a relatively positive power source terminal and its cathode connected to the first node and a second diode has its cathode connected to a negative power source terminal and its anode connected to the second node, and a first diode in the second set of diodes has its anode connected to the positive power source terminal and its cathode connected to the first node, while the second diode in the second set has its cathode connected to the negative power source terminal and its anode connected to the second node.

4. The apparatus according to claim 3, further including an indicator circuit configured to indicate whether either of said first and second power terminals or said third and fourth power terminals are coupled to receive said first and second voltages supplied by said primary and auxiliary power sources.

5. The apparatus according to claim 4, wherein said indicator circuit includes a first indicator that is configured to indicate whether or not said first and second power terminals are properly coupled to receive said first and second voltages, respectively, and a second indicator that is configured to indicate whether said third and fourth power terminals are properly coupled to receive said first and second voltages, respectively.

6. The apparatus according to claim 4, wherein said indicator circuit includes a first indicator that is configured to indicate whether or not said first and second power terminals are properly coupled to receive said first and second voltages, respectively, and a second indicator that is configured to indicate whether or not said third and fourth power terminals are properly coupled to receive said first and second voltages, respectively.

7. A method of enabling a telecommunication device to be powered through a circuit interruption device by a primary power source or an auxiliary power source, each power source being adapted to supply first and second voltages for operating said telecommunication device, comprising the steps of:

(a) providing first and second power terminals that are adapted to be respectively coupled to said first and second voltages supplied by one of said primary power source and said auxiliary power source;

(b) providing third and fourth power terminals that are adapted to be respectively coupled to said first and second voltages supplied by the other of said primary power source and said auxiliary power source; and (c) coupling said first, second, third and fourth power terminals to a circuit path having first and second nodes containing said telecommunication device and said circuit interruption device, through a protective circuit that is configured to
  i- couple power to said circuit path from said one of said primary power source and said auxiliary power source, in response to said first and second power terminals being respectively coupled to receive said first and second voltages supplied by said one of said primary power source and said auxiliary power source, but preventing power from being coupled to said circuit path from said one of said primary power source and said auxiliary power source, in response to said first and second power terminals being respectively coupled to receive said second and first voltages supplied by said one of said primary power source and said auxiliary power source, and ii- couple power to said circuit path from the other of said primary power source and said auxiliary power source, in response to said third and fourth power terminals being respectively coupled to receive said first and second voltages supplied by said either of said primary power source and said auxiliary power source, but preventing power from being coupled to said circuit path from said other of said primary power source and said auxiliary power source, in response to said third and fourth power terminals being respectively coupled to receive said second and first voltages supplied by said other of said primary power source and said auxiliary power source, said steps of coupling including the step of supplying power through first and second sets of diodes respectively connected between said first and second power supply connection terminals and respective first and second nodes of said power supply path, so as to be forward conducting for only a proper polarity connection of its associated power supply connection terminal to a respective power source, but preventing said circuit interruption device from being triggered in the event of an improper proper polarity connection of its associated power supply connection terminal to a respective power source, wherein a first diode of the first set of diodes has its anode connected to a relatively positive power source terminal and its cathode connected to the first node and a second diode has its cathode connected to a negative power source terminal and its anode connected to the second node, and a first diode in the second set of diodes has its anode connected to the positive power source terminal and its cathode connected to the first node, while the second diode in the second set has its cathode connected to the negative power source terminal and its anode connected to the second node.

8. The method according to claim 7, wherein said protective circuit includes an indicator circuit configured to indicate whether either of said first and second power terminals or said third and fourth power terminals are properly coupled to receive said first and second voltages supplied by said primary and auxiliary power sources.

9. The method according to claim 8, wherein said indicator circuit includes a first indicator that is configured to indicate whether or not said first and second power terminals are properly coupled to receive said first and second voltages, respectively, and a second indicator that is configured to indicate whether or not said third and fourth power terminals are properly coupled to receive said first and second voltages, respectively.

* * * * *